(12) United States Patent
Kusachi et al.

(10) Patent No.: US 6,620,522 B2
(45) Date of Patent: Sep. 16, 2003

(54) METAL BONDED DRILLING AND/OR CHAMFERING TOOL

(75) Inventors: Yoshikazu Kusachi, Iwata-gun (JP); Akihiko Nakagawa, Iwata-gun (JP)

(73) Assignee: Tenryu Seikyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/962,450

(22) Filed: Sep. 26, 2001

(65) Prior Publication Data

US 2002/0035890 A1 Mar. 28, 2002

(30) Foreign Application Priority Data

Sep. 26, 2000 (JP) .......................... 2000-291650

(51) Int. Cl.⁷ .............. B24B 9/00; B23B 51/00
(52) U.S. Cl. .............. 428/551; 428/553; 81/28; 408/144
(58) Field of Search ................ 419/5; 428/551, 428/553; 81/28; 408/144

(56) References Cited

U.S. PATENT DOCUMENTS 3,673,654 A * 7/1972 Rick ................... 29/97
6,338,907 B1 * 1/2002 Strelsky ............... 428/545

* cited by examiner

*Primary Examiner*—Daniel J. Jenkins
(74) *Attorney, Agent, or Firm*—Arent Fox Kintner Plotkin & Kahn, PLLC

(57) ABSTRACT

A metal bonded drilling tool which is improved in grinding performance with a long life and can drill a hole in a dry condition without the need for water. The metal bonded drilling tool includes a cylindrical body having an open front end portion, a shank integral with the cylindrical body and having a threaded hole for use in mounting the tool to a rotary tool, and numerous abrasive grains bonded to a front edge of the cylindrical body and to inner and outer cylindrical surfaces of the front end portion of the cylindrical body by a bond member formed primarily of copper alloy.

10 Claims, 8 Drawing Sheets

METAL BONDED DRILLING AND/OR CHAMFERING TOOL

BACKGROUND OF THE INVENTION

1. Field of the Invention

The present invention relates to a metal bonded drilling tool and a metal bonded chamfering tool.

2. Description of the Related Art

In the case of drilling a hole in a stone, concrete, or hard wall, it is conventionally general to mount a diamond core bit on an electric drill. According to this drilling method, however, it is not possible to instantaneously form a cut on a stone or the like, because the rotational speed of the diamond core bit is as low as 1000 to 2700 rpm. To cope with this problem, a center stick is attached to the diamond core bit at a central portion thereof. After forming a small cut on a subject material by means of the diamond core bit on the basis of the center stick, the center stick is removed and a hole is next drilled by only the core bit.

The diamond core bit is an impregnated sintered tool wherein the amount of projection of diamond abrasive grains is small. Accordingly, unless this tool is operated in a wet condition (where water is supplied during drilling), a drilling performance cannot be exhibited. Actually, water is supplied from a hose during drilling, or a sponge containing water is preliminarily inserted in the diamond core bit and the water is supplied from the sponge during drilling.

There is another method without mounting the center stick at the central portion of the diamond core bit. In this method, a guide ring is mounted on a subject material with an adhesive sheet interposed therebetween, and a hole is drilled on the basis of the guide ring by the diamond core bit mounted on the electric drill. According to this method, however, a drilling operation is troublesome and it cannot be performed at a site where no stains are allowed, such as the interior, because a wet condition is adopted.

As still another method, a boring machine for stones is fixed by screws to the surface of a subject material, and an impregnated type core drill is used to drill a hole in the subject material. However, since the boring machine is fixed by screws to the surface of the subject material before drilling, threaded holes for the screws must be preliminarily formed in the subject material and the work for mounting the boring machine is troublesome. Furthermore, also in this method, drilling must be performed in a wet condition.

On the other hand, in chamfering a hole formed on a stone or the like, a grinding wheel having a small diameter is mounted on a disc grinder, and the outer circumferential edge of the grinding wheel is used to chamfer the hole. As another method, a cup wheel having a small diameter is mounted on a disc grinder, and the outer circumferential edge of the cup wheel at a front end portion thereof is used to chamfer a hole formed on a stone or the like. According to these chamfering methods, however, the life of the grinding wheel or the cup wheel becomes short and there are variations in appearance of the chamfered hole obtained by the grinding wheel or the cup wheel, because the outer circumferential edge of the grinding wheel or the cup wheel is used for chamfering. Further, it is impossible to perform chamfering of a hole having a diameter smaller than the diameter of the grinding wheel or the cup wheel.

SUMMARY OF THE INVENTION

It is therefore an object of the present invention to provide a metal bonded drilling tool which can easily drill a hole in a hard material such as a stone or concrete without the use of a positioning jig for drilling.

It is another object of the present invention to provide a metal bonded chamfering tool which can chamfer a small hole formed in a hard material such as a stone or concrete.

In accordance with an aspect of the present invention, there is provided a metal bonded drilling tool comprising a cylindrical body having an open front end portion; a shank integral with said cylindrical body and having a threaded hole for use in mounting said tool to a rotary tool operating at a rotational speed of 5000 rpm or more; and numerous abrasive grains brazed to a front edge of said cylindrical body and to inner and outer cylindrical surfaces of said front end portion of said cylindrical body by a brazing member.

In accordance with another aspect of the present invention, there is provided a metal bonded chamfering tool comprising a cylindrical body having an open front end portion; a shank integral with said cylindrical body and having a threaded hole for use in mounting said tool to a rotary tool operating at a rotational speed of 5000 rpm or more; and numerous abrasive grains brazed to an outer cylindrical surface of said cylindrical body by a brazing member.

Preferably, said brazing member comprises a bond member formed primarily of copper alloy, said bond member containing a material selected from the group consisting of Ti, Al, and a mixture thereof; an average abrasive grain projection height is set to 30% or more of an average abrasive grain diameter, where said abrasive grain projection height is defined as the distance between the surface of a deepest portion of said bond member present between any two adjacent ones of said abrasive grains and the top of each of said two adjacent abrasive grains; and an average abrasive grain spacing is set to 200% or more of said average abrasive grain diameter, where said abrasive grain spacing is defined as the distance between the tops of said two adjacent abrasive grains.

Preferably, said copper alloy is selected from the group consisting of bronze containing 10 to 33 wt. % of Sn, brass containing 5 to 20 wt. % of Zn, and aluminum bronze containing 5 to 20 wt. % of Al. More preferably, said abrasive grains are selected from the group consisting of diamond, cubic boron nitride, silicon carbide, and cemented carbide powder.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
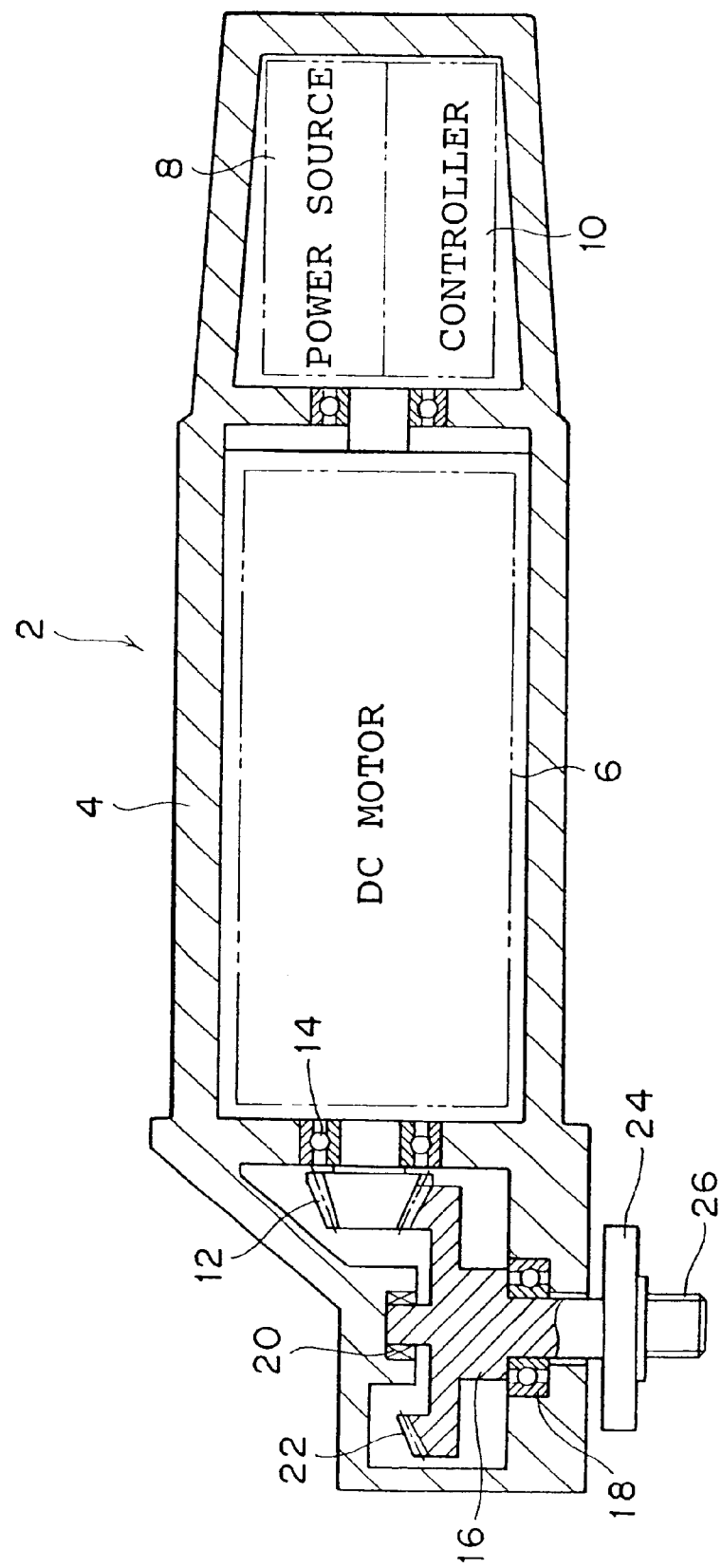
FIG. 1 is a schematic sectional view of a rotary tool such as a disc grinder to which the metal bonded drilling tool of the present invention is mountable.

Some preferred embodiments of the present invention will now be described with reference to the drawings. Referring to FIG. 1, there is shown a sectional view of a rotary tool 2 to which the metal bonded drilling tool of the present invention is mountable. A disc grinder such as Model 9520BL manufactured by K. K. Makita may be adopted as the rotary tool 2. The disc grinder is operated at a high rotational speed of 5000 to 12000 rpm, for example.

The rotary tool 2 has a body 4 accommodating a DC motor 6, a power supply 8, and a controller 10 as schematically shown in FIG. 1. The DC motor 6 has an output shaft (not shown) connected to a bevel gear 12 supported by a bearing 14. A drive shaft 16 is rotatably supported by a ball bearing 18 and a needle bearing 20. The drive shaft 16 is integrally formed with a bevel gear 22 meshing with the bevel gear 12. The drive shaft 16 is formed at its front end portion with a flange 24 and an externally threaded portion 26.

Figure 2:
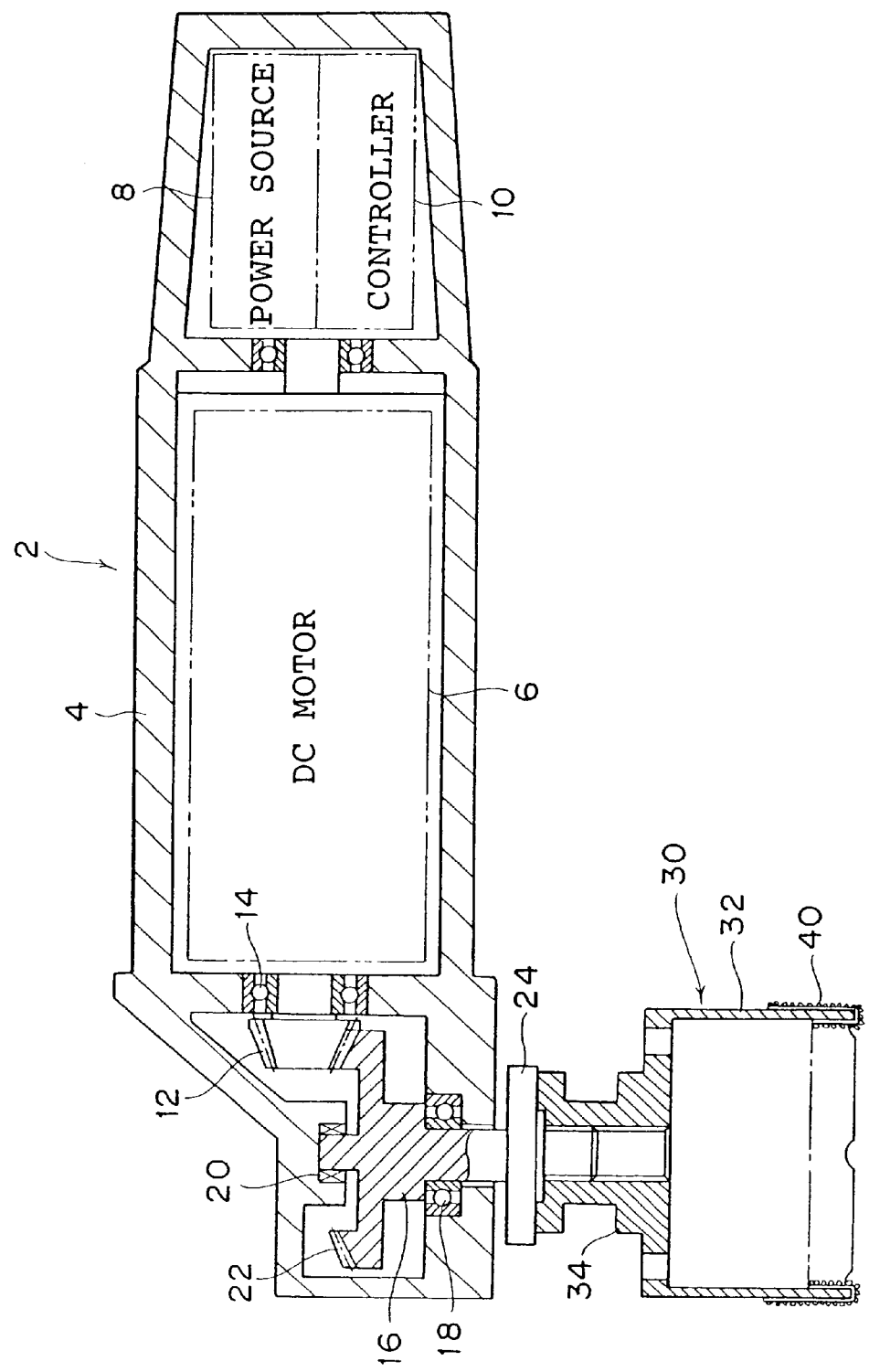
FIG. 2 is a schematic sectional view of the rotary tool to which a metal bonded drilling tool according to a first preferred embodiment of the present invention is mounted.
Figure 3:
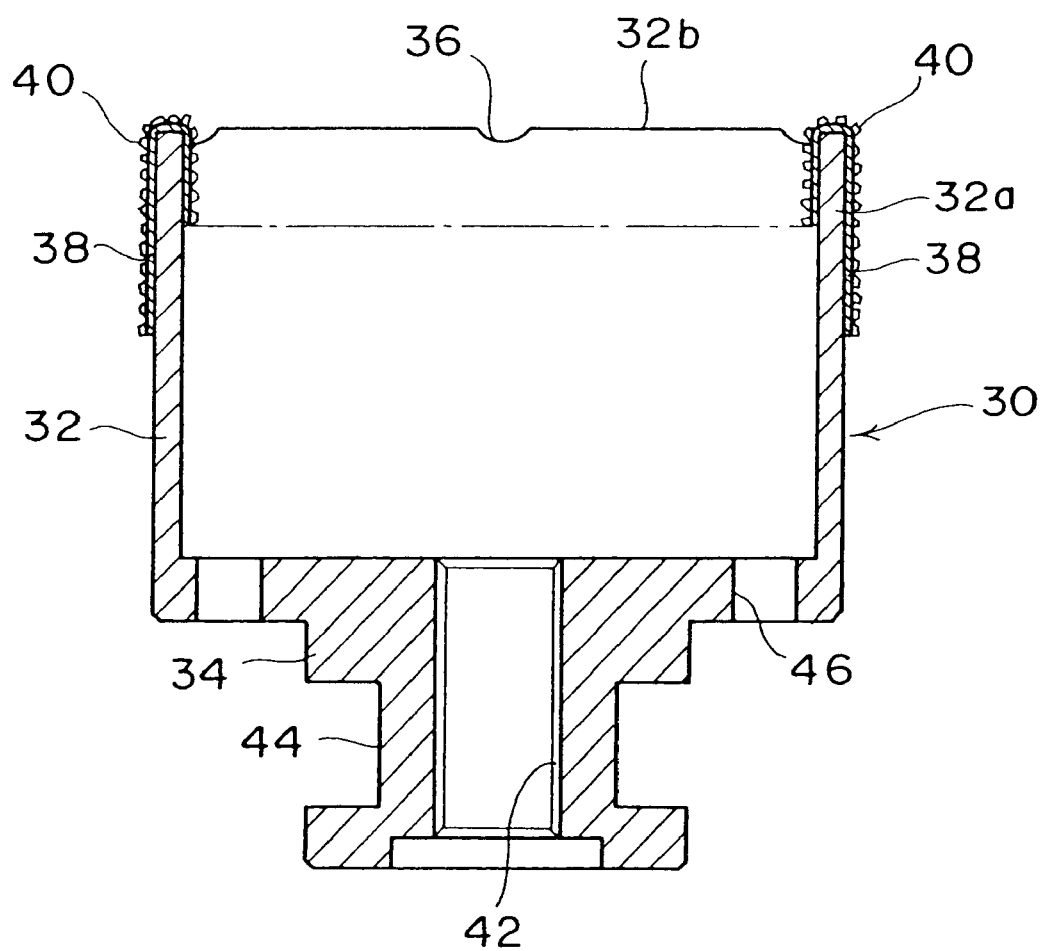
FIG. 3 is a vertical sectional view of the metal bonded drilling tool according to the first preferred embodiment.
Figure 4:
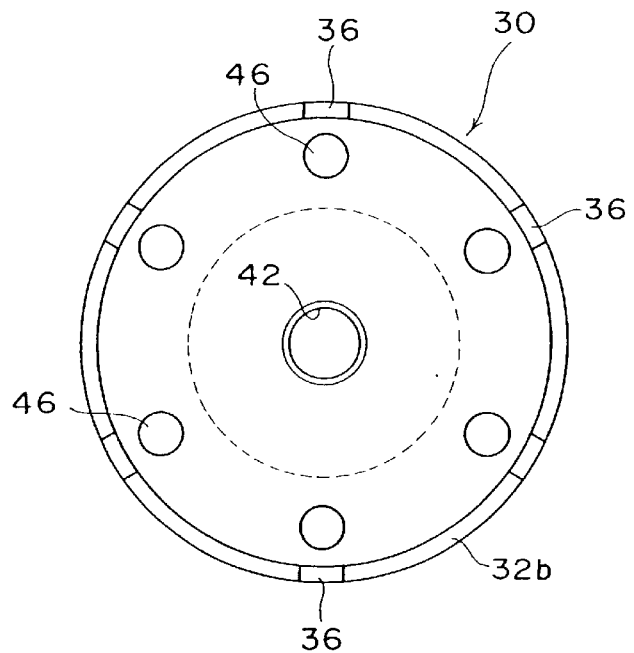
FIG. 4 is a plan view of FIG. 3.

Referring to FIG. 2, there is shown a condition where a metal bonded drilling tool 30 according to a first preferred embodiment of the present invention is mounted to the externally threaded portion 26 of the drive shaft 16 of the rotary tool 2. As best shown in FIG. 3, the metal bonded drilling tool 30 has a cylindrical body 32 having an open front end portion 32a and a shank 34 integral with the cylindrical body 32. The cylindrical body 32 and the shank 34 of the tool 30 are formed of steel. The cylindrical body 32 further has a front edge 32b formed with a plurality of recesses 36 spaced apart from each other. For example, six recesses 36 are formed as shown in FIG. 4.

Numerous diamond abrasive grains 40 are bonded by a metal bond member 38 to the front edge 32b of the cylindrical body 32 and to the inner and outer cylindrical surfaces of the front end portion 32a of the cylindrical body 32. For example, the diamond abrasive grains 40 are bonded by the metal bond member 38 to the inner cylindrical surface of the cylindrical body 32 in a range of about 8 mm from the front edge 32b and to the outer cylindrical surface of the cylindrical body 32 in a range of about 15 mm from the front edge 32b.

A manufacturing method for the metal bonded drilling tool 30 according to the first preferred embodiment will now be described. 66 wt. % of bronze powder containing 23 wt. % of Sn, 11 wt. % of Ti compound powder, and 20 wt. % of stearic acid as an organic viscous material are kneaded together with well stirring by using a kneader to obtain a paste mixture.

This paste mixture is applied to the inner and outer cylindrical surfaces of the cylindrical body 32 by using a spatula or the like. To set the thickness of the metal bond member 38, an excess amount of the paste mixture applied to the inner and outer cylindrical surfaces of the cylindrical body 32 is preferably removed by using a thickness gauge jig to obtain a predetermined uniform thickness of the coating of the paste mixture. Thereafter, a required amount of diamond abrasive grains is scattered on the coating of the paste mixture and attached thereto. Thereafter, the metal bonded drilling tool 30 is put into a vacuum furnace, and the vacuum furnace is evacuated to a vacuum of 3.9 Pa. Under this vacuum, the tool 30 is maintained at 950° C. for 20 minutes in the vacuum furnace. Thereafter, the tool 30 is removed from the vacuum furnace and cooled down to room temperature.

By maintaining the tool 30 at 950° C. for 20 minutes in the vacuum furnace, the paste mixture is molten. Further, by cooling the molten paste mixture to room temperature, it is solidified to be bonded to the cylindrical body 32, thus forming the metal bond member 38. Ti has a property of wetting the diamond abrasive grains 40 by its reducing power, and well soluble in bronze. Accordingly, the diamond abrasive grains 40 are chemically strongly fixed to the metal bond member 38, so that the separation of the diamond abrasive grains 40 from the metal bond member 38 can be prevented.

Figure 5:
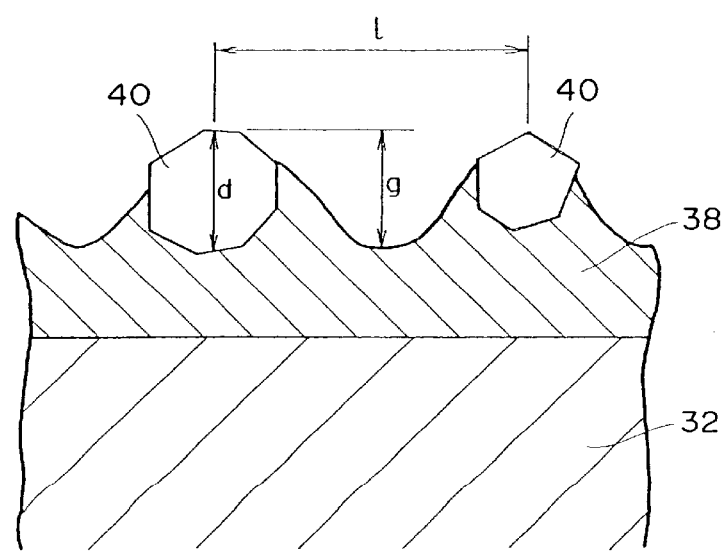
FIG. 5 is an enlarged sectional view of an essential part of the metal bonded drilling tool according to the first preferred embodiment.

Referring to FIG. 5 which is an enlarged sectional view of an essential part of the tool 30, the distance between the surface of a deepest portion of the metal bond member 38 present between any two adjacent ones of the abrasive grains 40 and the top of each diamond abrasive grain 40 is defined as an abrasive grain projection height. In this case, an average abrasive grain projection height g is preferably set to 30% or more of an average abrasive grain diameter d. Further, when the distance between the tops of the two adjacent diamond abrasive grains 40 is defined as an abrasive grain spacing, an average abrasive grain spacing 1 is preferably set to 200% or more of the average abrasive grain diameter d. Thus, the average abrasive grain projection height g of the diamond abrasive grains 40 is set larger than that of a conventional grinding tool, and the average abrasive grain spacing 1 is also set larger. With this configuration, an improved grinding performance or drilling performance can be exhibited.

The average abrasive grain projection height g may be adjusted by controlling the thickness of the coating of the paste mixture. In general, the thickness of the coating of the paste mixture is preferably set to 70 to 120% of the average abrasive grain diameter d. The average abrasive grain projection height g was obtained by the following method. Three arbitrary positions on the cylindrical body 32 of the tool 30 on which the diamond abrasive grains 40 had been bonded were selected, and the abrasive grain projection heights of ten grains 40 at each position were measured. Thus, totally 30 grains 40 were used for the measurement. Then, an arithmetic mean of the abrasive grain projection heights of the 30 grains 40 was calculated to obtain the average abrasive grain projection height g. The measurement of the abrasive grain projection heights was made by using a microscope. The grain size of the diamond abrasive grains 40 is preferably set to 30 to 400 mesh. The material of the abrasive grains usable in the present invention is not limited to diamond, but CBN (cubic boron nitride), SiC (silicon carbide), or cemented carbide powder may also be adopted.

The copper alloy usable in the present invention includes bronze containing 10 to 33 wt. % of Sn, brass containing 5 to 20 wt. % of Zn, and aluminum bronze containing 5 to 20 wt. % of Al. Particularly in the case of aluminum bronze, the abrasive grains can be bonded to the metal bond member without the addition of Ti compound powder by increasing the vacuum in heating. Further, even when the vacuum in heating is low, the abrasive grains can be bonded to the metal bond member with the addition of a small amount of Ti compound powder. The Ti compound powder used in this preferred embodiment contains 50 atom % of Al (about 36 wt. % of Al). The content of Ti in the metal bond member is preferably set to about 10 to 15 wt. %. The particle size of the Ti compound powder is preferably set to about 240 to 350 mesh.

The Ti compound powder may be replaced by Ti powder, Al powder, or Al compound powder. Ti or Al has a property of wetting ceramic abrasive grains by its reducing power, and well soluble in the copper alloy. Further, Ti or Al functions to enhance the strength of the copper alloy, so that it is a suitable additive for the metal bond member. Examples of the organic viscous material include stearic acid, paraffin, and polyethylene glycol, which may be used solely or in combination.

Referring again to FIG. 3, the shank 34 of the tool 30 is formed with an internally threaded hole 42 for engaging the externally threaded portion 26 of the drive shaft 16 of the rotary tool 2 (see FIG. 1) and with a wrench engaging portion 44 for engaging a wrench to mount the tool 30 to the externally threaded portion 26. As also shown in FIG. 4, the cylindrical body 32 has a base end portion (closed bottom) formed with a plurality of holes 46 circumferentially spaced apart from each other. These holes 46 function as air inlets for taking the outside air into the cylindrical body 32 to radiate heat generated near the front edge 32b during drilling. The direction of rotation of the tool 30 in engaging the internally threaded hole 42 of the shank 34 to the externally threaded portion 26 of the drive shaft 16 must be set opposite to the direction of rotation of the drive shaft 16 during drilling. By this setting, the tool 30 is prevented from separating from the drive shaft 16 during drilling.

Figure 6A:
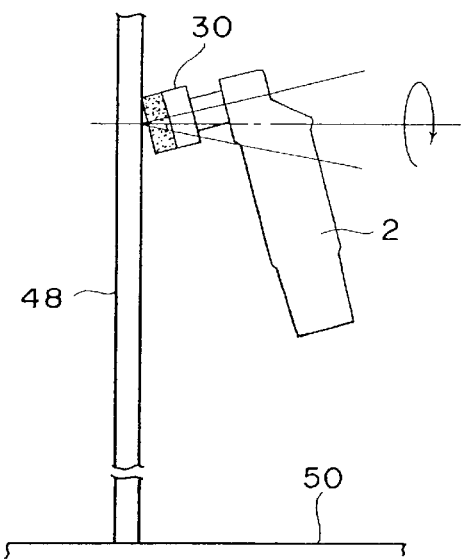
FIG. 6A is a schematic side view for illustrating a first step of forming a cut in a hard wall in the operation of the metal bonded drilling tool.
Figure 6B:
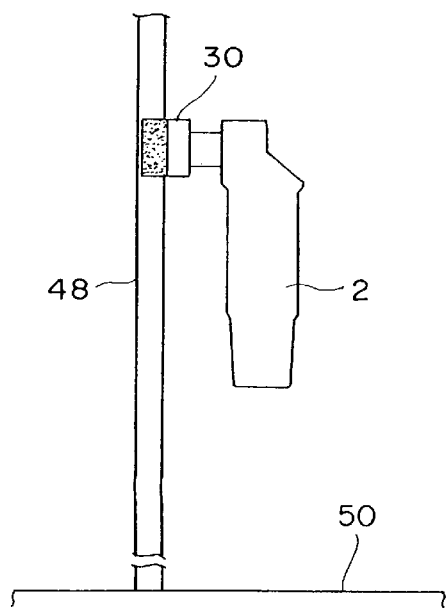
FIG. 6B is a schematic side view for illustrating a second step of drilling a hole in the hard wall after the above first step.

FIGS. 6A and 6B illustrate a drilling operation of the tool 30 to a wall 48 made of concrete. Reference numeral 50 denotes a floor. As shown in FIG. 6A, the tool 30 is first inclined so that the axis of rotation of the tool 30 is inclined with respect to the normal to the wall 48 by about 5 to 30 degrees, and the tool 30 is then rotated in this inclined condition. Since the tool 30 is mounted on the rotary tool 2 such as a disc grinder, the tool 30 is rotated at a high speed of 6000 to 12000 rpm. Accordingly, a cut can be instantaneously formed on the wall 48 by the tool 30.

After forming the cut on the wall 48, the tool 30 is held in position so that the axis of rotation of the tool 30 is substantially normal to the wall 48 or inclined by an angle smaller than the inclination angle set in forming the above cut, and the tool 30 is then rotated under thrust, thereby allowing easy drilling into the wall 48. Since the projection height of the diamond abrasive grains 40 from the metal bond member 38 is large, the drilling operation can be performed without the need for water, i.e., in a dry condition. Furthermore, since the rotational speed of the tool 30 during drilling is high, the cut can be formed instantaneously, so that a hole can be drilled at a predetermined position without the use of a positioning jig for drilling.

Figure 7:
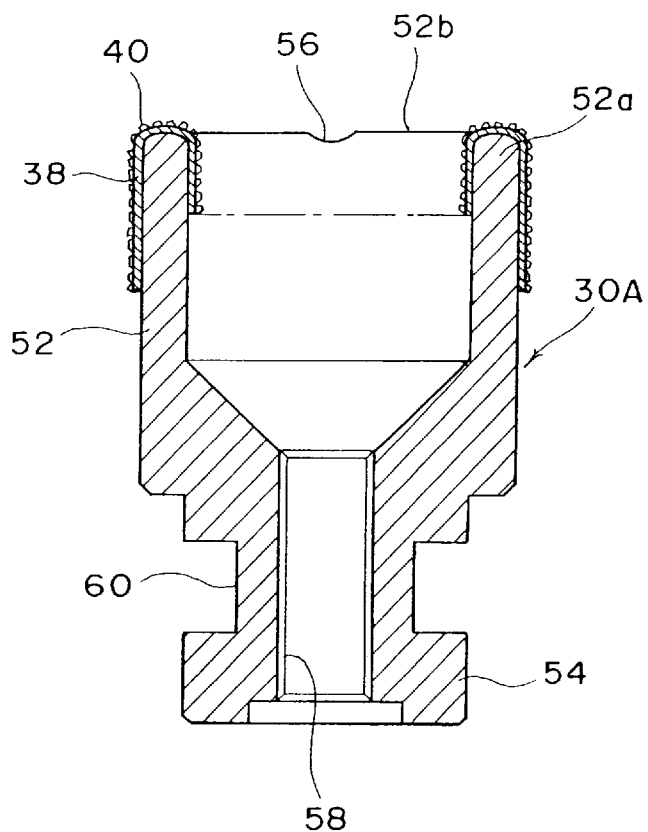
FIG. 7 is a vertical sectional view of a metal bonded drilling tool according to a second preferred embodiment of the present invention.
Figure 8:
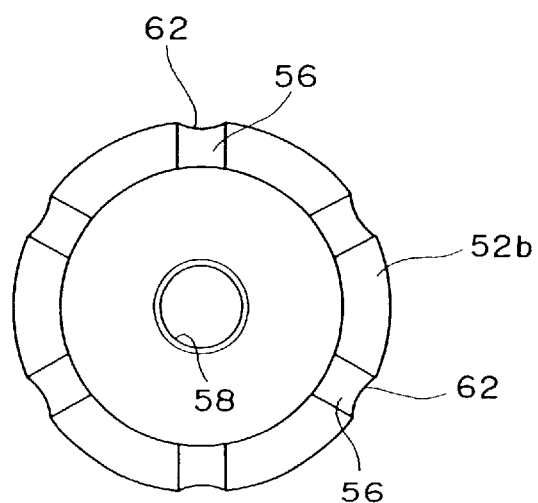
FIG. 8 is a plan view of FIG. 7.

Referring next to FIG. 7, there is shown a sectional view of a metal bonded drilling tool 30A according to a second preferred embodiment of the present invention. FIG. 8 is a plan view of FIG. 7. In this preferred embodiment, the tool 30A has a cylindrical body 52 having a wall thickness larger than that of the cylindrical body 32 of the tool 30 according to the first preferred embodiment. Like the first preferred embodiment, the tool 30A has a shank 54 formed with an internally threaded hole 58 and a wrench engaging portion 60. Further, numerous diamond abrasive grains 40 are bonded through a metal bond member 38 to a front edge 52b of the cylindrical body 52 and to the inner and outer cylindrical surfaces of a front end portion 52a of the cylindrical body 52. The diamond abrasive grains 40 are bonded to the inner cylindrical surface of the front end portion 52a in a suitable range of about 5 to 10 mm from the front edge 52b and to the outer cylindrical surface of the front end portion 52a in a suitable range of about 15 to 20 mm.

As best shown in FIG. 8, the front edge 52b of the cylindrical body 52 of the tool 30A is formed with a plurality of recesses (radially extending grooves) 56 spaced apart from each other, and the outer cylindrical surface of the cylindrical body 52 is formed with a plurality of axially extending grooves 62 circumferentially spaced apart from each other. By forming these grooves 56 and 62 on the front edge 52b and on the outer cylindrical surface of the cylindrical body 52 to provide a change in form, the cutting performance of the tool 30A can be improved. Similar grooves may be also formed on the inner cylindrical surface of the cylindrical body 52.

Figure 9:
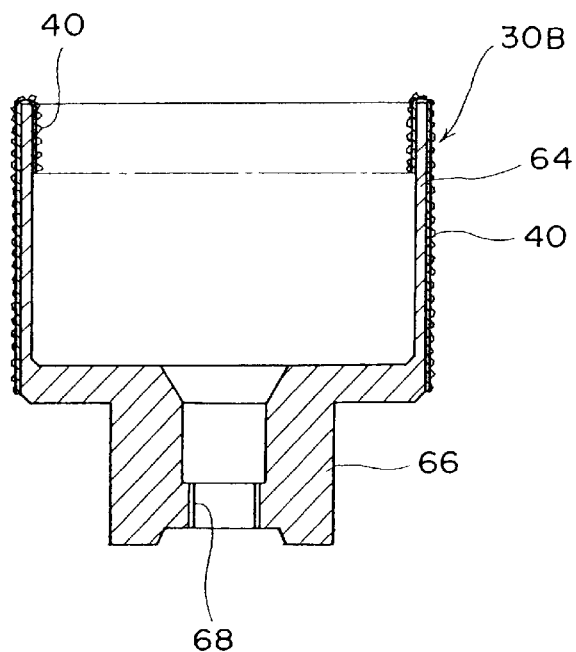
FIG. 9 is a vertical sectional view of a metal bonded drilling tool according to a third preferred embodiment of the present invention.

Referring next to FIG. 9, there is shown a sectional view of a metal bonded drilling tool 30B according to a third preferred embodiment of the present invention. In this preferred embodiment, numerous diamond abrasive grains 40 are bonded to the entire outer cylindrical surface of a cylindrical body 64 by a metal bond member. Of course, the diamond abrasive grains 40 are also bonded to a front edge of the cylindrical body 64 and to the inner cylindrical surface of a front end portion of the cylindrical body 64. Like the first preferred embodiment, the tool 30B has a shank 66 formed with an internally threaded hole 68. Thus, the diamond abrasive grains 40 are bonded to the entire outer cylindrical surface of the cylindrical body 64 of the tool 30B, so that the drilling tool 30B can be used also as a chamfering tool.

Figure 10:
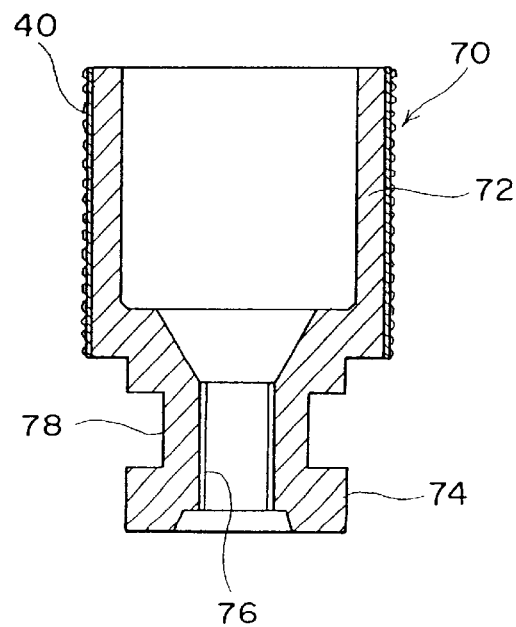
FIG. 10 is a vertical sectional view of a metal bonded chamfering tool according to a fourth preferred embodiment of the present invention.
Figure 11:
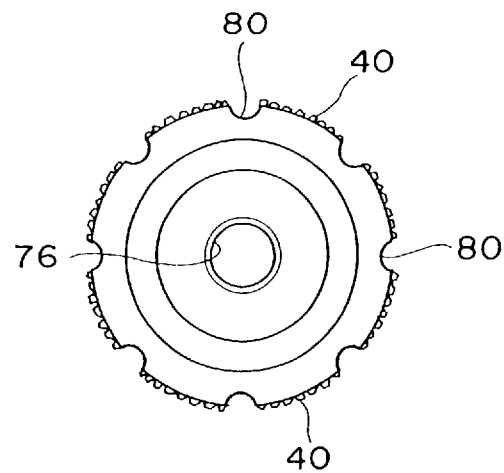
FIG. 11 is a plan view of FIG. 10.

Referring next to FIG. 10, there is shown a sectional view of a metal bonded chamfering tool 70 according to a fourth preferred embodiment of the present invention. FIG. 11 is a plan view of FIG. 10. The metal bonded chamfering tool 70 has a cylindrical body 72 and a shank 74 integral with the cylindrical body 72. The cylindrical body 72 and the shank 74 are formed of steel. Numerous diamond abrasive grains 40 are bonded to only the entire outer cylindrical surface of the cylindrical body 72 by a metal bond member. The shank 74 is formed with an internally threaded hole 76 and a wrench engaging portion 78.

Figure 12:
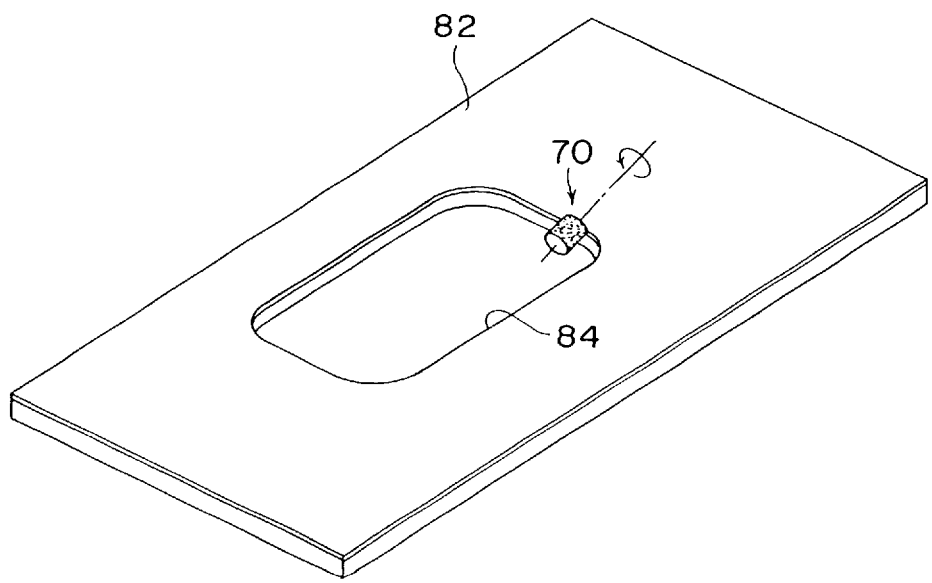
FIG. 12 is a schematic perspective view for illustrating a chamfering operation of the metal bonded chamfering tool.

As shown in FIG. 11, the outer cylindrical surface of the cylindrical body 72 is formed with a plurality of axially extending grooves 80 circumferentially spaced apart from each other. By forming these grooves 80 on the outer cylindrical surface of the cylindrical body 72 to provide a change in form, the cutting performance of the tool 70 can be improved. FIG. 12 illustrates a chamfering operation of the tool 70. Referring to FIG. 12, reference numeral 82 denotes a stone. The stone 82 has a hole 84. The hole 84 can be easily chamfered by the tool 70.

According to the metal bonded drilling tool of the present invention, the abrasive grains are chemically strongly fixed to the metal bond member. Accordingly, the separation of the abrasive grains from the metal bond member during drilling can be prevented, and a stable drilling performance can be maintained for a long period of time. Further, since the drilling tool is mounted on a disc grinder or the like operating at a high rotational speed, a drilling operation can be performed in a dry condition without the need for water. Further, a desired drilling operation can be performed at a predetermined position without the use of a positioning jig for drilling.

According to the metal bonded chamfering tool of the present invention, the abrasive grains are chemically strongly fixed to the metal bond member. Accordingly, the separation of the abrasive grains from the metal bond member can be prevented during chamfering, and a stable chamfering performance can be maintained for a long period of time. Further, the outer size of the chamfering tool can be reduced to thereby allow efficient chamfering of a small hole.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A metal bonded drilling tool comprising:
   a cylindrical body having an open front end portion;
   a shank integral with said cylindrical body and having a threaded hole for use in mounting said tool to a rotary tool operating at a rotational speed of 5000 rpm or more; and
   numerous abrasive grains brazed to a front edge of said cylindrical body and to inner and outer cylindrical surfaces of said front end portion of said cylindrical body by a brazing member.

2. A metal bonded drilling tool according to claim 1, wherein:
   said brazing member comprises a bond member formed primarily of copper alloy, said bond member containing a material selected from the group consisting of Ti, Al, and a mixture thereof;
   an average abrasive grain projection height is set to 30% or more of an average abrasive grain diameter, where said abrasive grain projection height is defined as the distance between the surface of a deepest portion of said bond member present between any two adjacent ones of said abrasive grains and the top of each of said two adjacent abrasive grains; and
   an average abrasive grain spacing is set to 200% or more of said average abrasive grain diameter, where said abrasive grain spacing is defined as the distance between the tops of said two adjacent abrasive grains.

3. A metal bonded drilling tool according to claim 2, wherein said copper alloy is selected from the group consisting of bronze containing 10 to 33 wt. % of Sn, brass containing 5 to 20 wt. % of Zn, and aluminum bronze containing 5 to 20 wt. % of Al.

4. A metal bonded drilling tool according to claim 1, wherein said abrasive grains are selected from the group consisting of diamond, cubic boron nitride, silicon carbide, and cemented carbide powder.

5. A metal bonded drilling tool according to claim 1, wherein at least one of said front edge, said inner cylindrical surface, and said outer cylindrical surface of said cylindrical body is formed with a plurality of recesses spaced apart from each other.

6. A metal bonded chamfering tool comprising:
   a cylindrical body having an open front end portion;
   a shank integral with said cylindrical body and having a threaded hole for use in mounting said tool to a rotary tool operating at a rotational speed of 5000 rpm or more; and
   numerous abrasive grains brazed to an outer cylindrical surface of said cylindrical body by a brazing member.

7. A metal bonded chamfering tool according to claim 6, wherein:
   said brazing member comprises a bond member formed primarily of copper alloy, said bond member containing a material selected from the group consisting of Ti, Al, and a mixture thereof;
   an average abrasive grain projection height is set to 30% or more of an average abrasive grain diameter, where said abrasive grain projection height is defined as the distance between the surface of a deepest portion of said bond member present between any two adjacent ones of said abrasive grains and the top of each of said two adjacent abrasive grains; and
   an average abrasive grain spacing is set to 200% or more of said average abrasive grain diameter, where said abrasive grain spacing is defined as the distance between the tops of said two adjacent abrasive grains.

8. A metal bonded chamfering tool according to claim 7, wherein said copper alloy is selected from the group consisting of bronze containing 10 to 33 wt. % of Sn, brass containing 5 to 20 wt. % of Zn, and aluminum bronze containing 5 to 20 wt. % of Al.

9. A metal bonded chamfering tool according to claim 6, wherein said abrasive grains are selected from the group consisting of diamond, cubic boron nitride, silicon carbide, and cemented carbide powder.

10. A metal bonded chamfering tool according to claim 6, wherein at least one of said front edge, said inner cylindrical surface, and said outer cylindrical surface of said cylindrical body is formed with a plurality of recesses spaced apart from each other.

* * * * *